2,755,193

HYDROCARBON WAX CONTAINING A DIARYL KETONE

George G. Rumberger, Neenah, Wis., assignor to Marathon Corporation, Rothschild, Wis., a corporation of Wisconsin No Drawing. Application November 12, 1952, Serial No. 320,127

3 Claims. (Cl. 106—270)

This invention relates to wax compositions which are color stable in the presence of light. More specifically, this invention relates to the use of inhibitors which stabilize the color of petroleum hydrocarbon waxes.

Although paraffin waxes are to some extent discolored by the action of light, microcrystalline waxes having a molecular weight in excess of about 500 have been noted to be particularly affected and discolor rapidly upon exposure to light, especially natural sunlight. When such waxes are used in candles, molded products, paper coatings, or other articles likely to be exposed to light, this discoloration is undesirable. Incorporation of resins, soaps, polymers, or other modifying ingredients often catalyze the discoloring reaction, and ordinary oxidation inhibitors such as naphthols, cresols, phenols and aryl amines do not prevent the discoloration, and even accelerate the reaction in some cases.

I have found that two particular groups of ketones are effective in eliminating or reducing the discoloration of microcrystalline waxes and other waxy solid bodies. One class of compounds comprises the group:

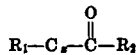

where
- $R_1$ is an aryl group
- C are straight chain carbon atoms
- X is an integer from 0 to 3
- $R_2$ is an aryl or alkyl group $R_1$ may be aryl, or substituted aryl, or a condensed aryl such as naphthalene, indene or anthracene. The straight chain carbons ($C_x$) may be connected by single, double or triple bonds, or may be alkyl substituted in one or more positions. $R_2$ is an aryl, substituted aryl, or alkyl group containing one to ten carbon atoms.

Examples of this class of materials are benzophenone; phenyl p-tolyl ketone; phenyl xylyl ketone; 1,6, diphenyl hexanone-3; 1 phenyl decene-5 acetophenone; phenyl undecyl ketone; benzoyl acetone; xanthone; benzal acetone; benzal acetophenone; and methoxy benzophenone.

A second class of materials effective in retarding color development due to exposure to light are the cyclic ketones, such as d-camphor, cyclohexanone, cyclodecanone, or benzyl cyclohexanone.

In general, I prefer to use ketones which are soluble in molten wax and which crystallize with the wax when cooled to room temperature. Although liquid ketones can be used, those which are solid at ordinary room temperature are preferred, due to the fact that liquid materials render the wax soft and tacky. If the solid ketones bloom to the surface of the wax after solidification, their usefulness is further improved, for in addition to creating more protection from light they diminish surface tack and render the product more non-blocking.

I have found the ketones as used according to this invention to be effective whether the wax is solid or suspended in water as in an emulsion or paste, or in solution. Cold creams containing wax and related waxy products are enhanced by addition of this class of light inhibitors, and rendered stable to light. Solutions of the wax containing the inhibitors are effective as antisunburn lotions, or the inhibitors alone in solution can be used for this purpose. I have found the wax discoloration inhibitors of my invention especially beneficial in wax polishes and other wax preparations used as protective finishes.

In use in solid wax preparations such as figures, candles, cast objects, and the like, the ketones of my invention should be employed in an amount of from .025% to about 2.0% by weight. I prefer for most uses to employ about 0.1% to about .5% by weight. When waxes are emulsified or dissolved in a solvent, more inhibitor is required and for extreme storage stability, as much as 5.0% by weight may be required due to the dilution of the inhibitor by water or solvent.

In the following example is set forth some of the typical materials which may be used according to my invention:

EXAMPLE 1

0.25% of phenyl p-tolyl ketone, phenyl undecyl ketone, benzophenone, benzyloyl acetone, xanthone, benzal acetone, benzal acetophenone, and d-camphor were separately dissolved in 99.75% by weight microcrystalline wax having a melting point of 146° F. Portions of each composition were weighed on a glass plate and melted to give uniform films 1 mm. thick. After the wax compositions had congealed, the plates were compared with standard colors in the dictionary of Color (Maerz and Paul—first edition 1930—McGraw-Hill Book Company) and the colors recorded. The plates were then exposed uniformly for four weeks (28 days) in a south window, and at the end of the test period, the color was measured as before. Table I gives the results of the colors developed:

Table I

| Composition | Color Before Exposure | | | Color After 4 Weeks' Exposure | | |
|---|---|---|---|---|---|---|
| | Plate | Column | Line | Plate | Column | Line |
| A. 146° F. Microcrystalline Wax (control) | 17 | B | 3 | 11 | E | 2 |
| B. A plus 0.25% phenyl p-tolyl ketone | 18 | A | 2 | 11 | B | 1 |
| C. A plus 0.25% phenyl undecyl ketone | 17 | A | 3 | 11 | C | 1 |
| D. A plus 0.25% benzophenone | 17 | B | 3 | 11 | C | 1 |
| E. A plus 0.25% benzoyl acetone | 17 | B | 3 | 11 | C | 1 |
| F. A plus 0.25% xanthone | 18 | A | 3 | 11 | D | 1 |
| G. A plus 0.25% benzal acetone | 17 | B | 3 | 11 | D | 2 |
| H. A plus 0.25% benzal acetophenone | 18 | B | 2 | 11 | D | 2 |
| I. A plus 0.25% d-camphor | 17 | A | 4 | 11 | D | 2 |

EXAMPLE 2

0.5% by weight methoxy benzophenone was added to each of the following: white oil, Vaseline, lard, 130/32° F. melting point paraffin, 160/65° F. melting point microcrystalline wax. Control samples containing no inhibitor and the compositions above were exposed to an ultraviolet light source for three days. At the end of the test period, all control samples had a bad color, and odor had developed in the lard, Vaseline and white oil. The color and odor of the samples containing methoxy benzophenone were still good.

When inhibitors such as disclosed hereinbefore are incorporated in waxy coatings or films used for packaging, not only are the coatings and films protected, but also the contents of the package when they are subject to the action of light. This result is believed to be due to the fact that the ketones herein employed have a screening effect on those wavelengths of light which cause discoloration.

I claim:

1. A composition consisting essentially of petroleum hydrocarbon wax and a solid diaryl ketone in amount from about 0.025% to about 5% by weight to inhibit discoloration.

2. A composition consisting of from 95 to 99.75% by weight petroleum microcrystalline wax and a solid diaryl ketone in amount from about 0.025% to about 5% by weight to inhibit discoloration by light.

3. A composition consisting essentially of petroleum microcrystalline wax and a discoloration inhibitor selected from the group consisting of benzophenone, phenyl p-tolyl ketone, phenyl xylyl ketone, 1,6, diphenyl hexanone-3, 1 phenyl decene-5 acetophenone, phenyl undecyl ketone, benzoyl acetone, xanthone, benzal acetone, benzal acetophenone and methoxy benzophenone in amount from about 0.025% to about 5% by weight.

References Cited in the file of this patent

UNITED STATES PATENTS

| | | |
|---|---|---|
| 2,165,261 | Hewlett | July 11, 1939 |
| 2,176,952 | Berberich | Oct. 24, 1939 |
| 2,221,380 | Horsch | Nov. 12, 1940 |
| 2,407,087 | Lieber et al. | Sept. 3, 1946 |
| 2,422,247 | Lieber et al. | June 17, 1947 |
| 2,430,058 | Klaber | Nov. 4, 1947 |
| 2,477,244 | Gaynor | July 26, 1949 |
| 2,510,009 | Bruins | May 30, 1950 |
| 2,619,465 | Scanley | Nov. 25, 1952 |